Feb. 8, 1966 J. D. WINTERS ETAL 3,233,730
CAN CARRIER

Filed Dec. 2, 1963 5 Sheets-Sheet 1

INVENTORS
JOHN D. WINTERS
NORMAN H. MOORE
BY

ATTORNEYS

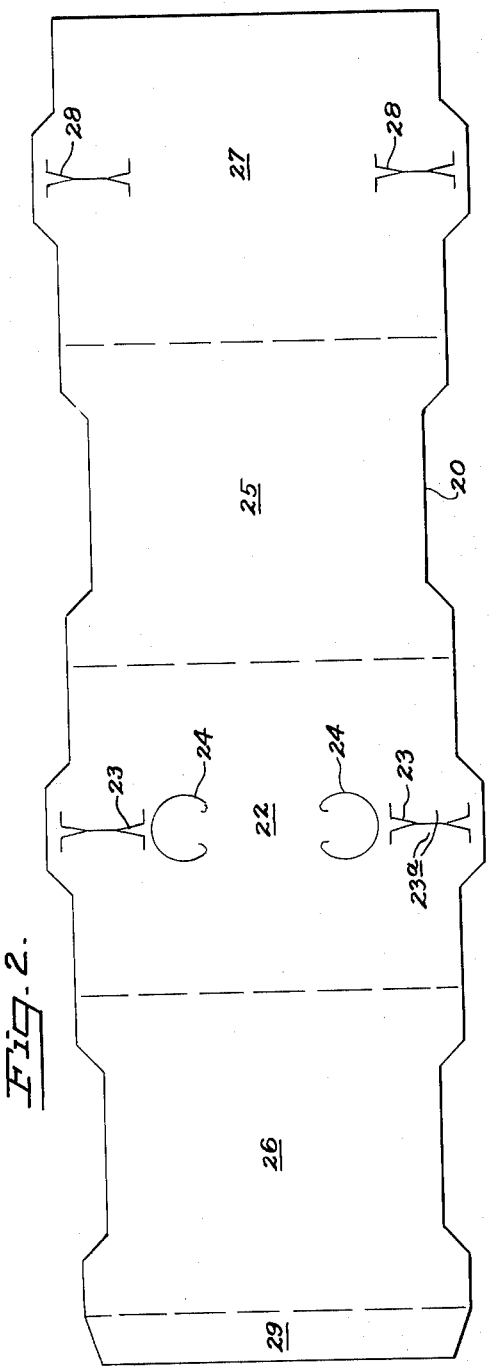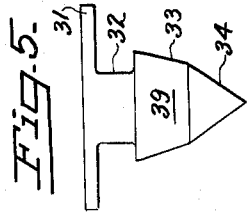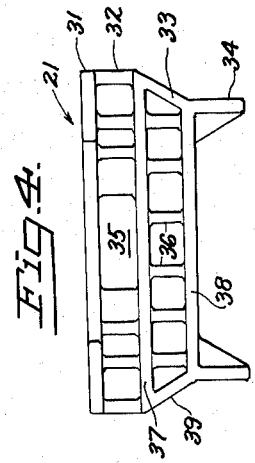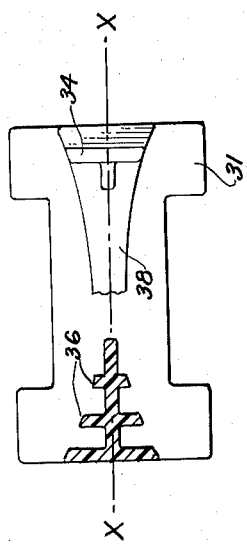

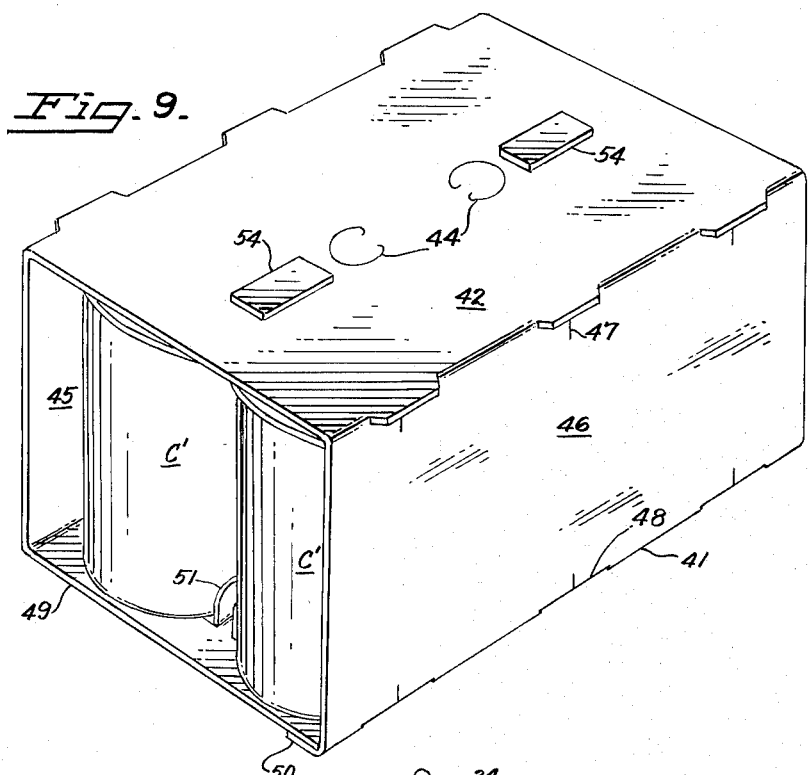
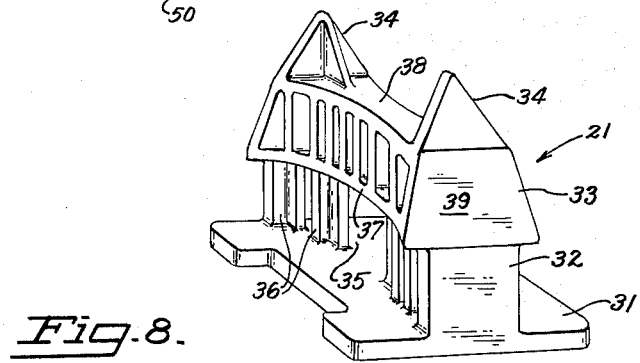

Feb. 8, 1966 J. D. WINTERS ETAL 3,233,730
CAN CARRIER
Filed Dec. 2, 1963 5 Sheets-Sheet 4

INVENTORS
JOHN D. WINTERS
BY NORMAN H. MOORE
ATTORNEYS

Feb. 8, 1966 J. D. WINTERS ETAL 3,233,730
CAN CARRIER
Filed Dec. 2, 1963 5 Sheets-Sheet 5
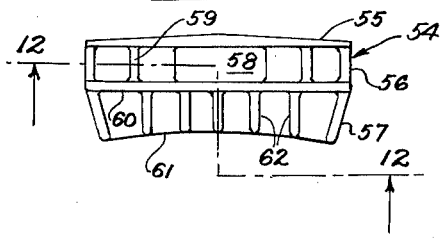
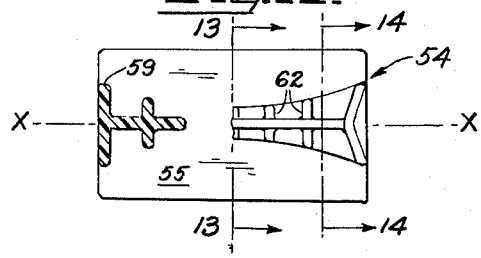
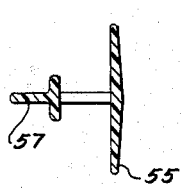
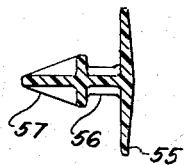
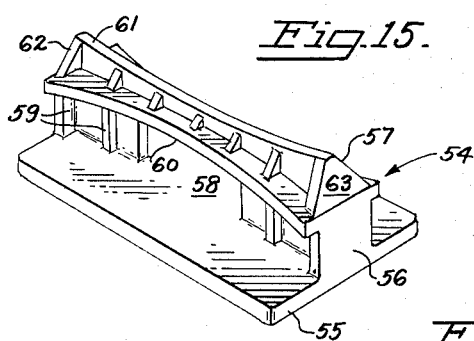
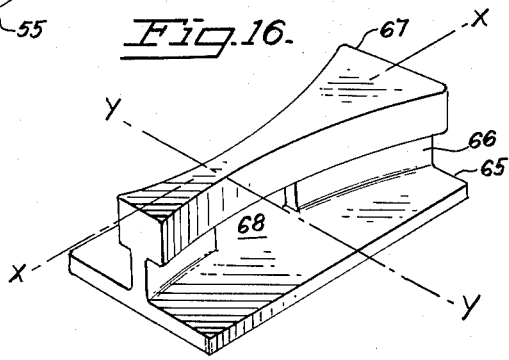
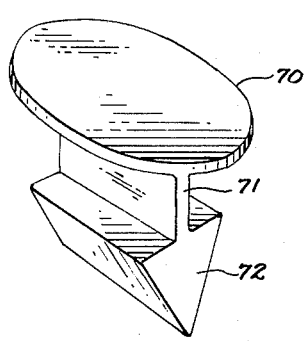
INVENTORS
JOHN D. WINTERS
BY NORMAN H. MOORE
ATTORNEYS United States Patent Office 3,233,730
Patented Feb. 8, 1966

3,233,730
CAN CARRIER
John D. Winters, Oakland, and Norman H. Moore, Palo Alto, Calif., assignors to Fibreboard Paper Products Corporation, San Francisco, Calif., a corporation of Delaware
Filed Dec. 2, 1963, Ser. No. 327,350
18 Claims. (Cl. 206—65)

This invention relates to an improved can carrier and more particularly relates to a paperboard blank adapted to be arranged in combination with one or more clips to form a carrier for transporting a plurality of cylindrical objects or the like.

The packaging art affords many carrier arrangements adapted to be erected for transporting cylindrical beverage cans having chines formed thereon. Many such carriers comprise a wrap-around paperboard blank and a type of locking means arranged therewith to retain a plurality of cans in aligned relationship. Such locking means generally comprise tab portions formed out of the blank or independent locking elements. Further carriers employ a locking device between opposed can chines which attempts to squeeze the chines together to effect the can retaining function. Reduction of the total carrier cost and efficient can retention are primary objectives sought in connection with any such packaging arrangement.

In order to afford such a cost reduction, the packaging industry has attempted to reduce the caliper and/or total area of the employed paperboard blank. Also, the industry has moved towards the use of cans having a thin wall thickness. Due to their fragile nature, such cans must be securely held in the carrier to insure that the cans are not damaged, due to contact with each other or subjection to extraneous forces. Furthermore, it is contemplated that aluminum cans having only a chine at the upper end thereof may be employed. The packaging problems obviously become even more acute when attempts are made to efficiently package such cans.

This invention provides an improved can carrier arranged to efficiently retain a plurality of cylindrical objects such as chined cans therein. Essentially, the carrier of this invention comprises a wrap-around blank in combination with strategically arranged clips which function to positively separate and retain a plurality of aligned cans in a predetermined position. Side walls of the erected blank function in conjunction with the clips, arranged between opposed pairs of the cans, to positively hold the chines of the cans against adverse movements. In general, the clips comprise a base portion arranged to abut one of the panels of the carton, a post portion having bearing surface portions arranged between opposed can chines and a flared portion having arcuate surface portions substantially conforming to the curvature of the cans.

In accordance with the above discussions, an object of this invention is to provide a paperboard material of minimum blank size, minimum caliper and minimum grade which may be expeditiously erected to form a can carrier.

Another object of this invention is to provide an efficient wrap-around can carrier comprising a paperboard blank in combination with one or more locking clips arranged to positively retain aligned cylindrical objects therein.

A further object of this invention is to provide a clip which is adapted to be employed in combination with various types of erected paperboard blanks for efficiently retaining a plurality of cylindrical objects therein.

A still further object of this invention is to provide a carrier for preventing the chine of a can from damaging wall portions of an adjacent thin tin or aluminum can by holding the can chines in alignment.

Further and more specific objects of this invention will become apparent from the following description taken in connection with the accompanying drawings wherein:

FIG. 1 is an isometric view disclosing a first can carrier embodiment having six cylindrical cans arranged therein;

FIG. 2 discloses a flattened paperboard blank shown in its erected position in FIG. 1;

FIG. 3 is a partially sectioned bottom plan view of a first clip embodiment which may be employed in the carrier of FIG. 1;

FIGS. 4 and 5 are side and end elevational views, respectively, of the clip embodiment shown in FIG. 3;

FIG. 8 is an isometric view of the clip embodiment shown in FIGS. 3-5;

FIG. 9 is an isometric view disclosing a second can carrier embodiment having six cylindrical cans arranged therein;

Figure 10:
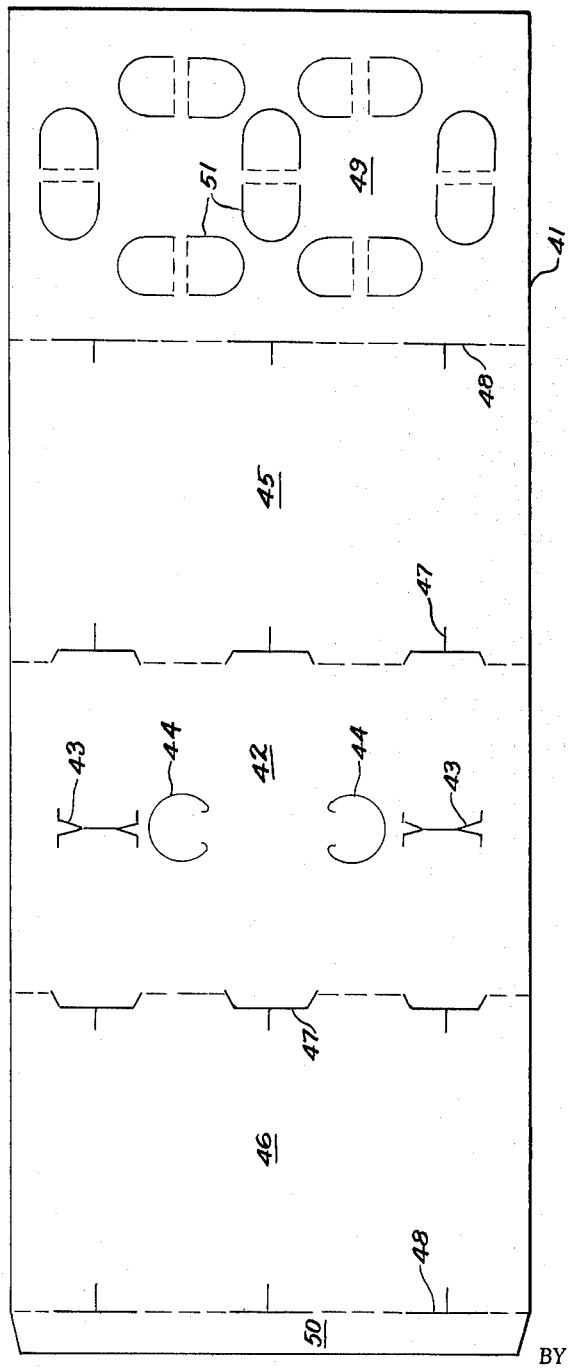

FIG. 10 discloses a flattened paperboard blank shown in its erected position in FIG. 9;

FIG. 11 is a side elevational view disclosing another clip embodiment;

FIG. 12 is a sectional view taken on lines 12—12 in FIG. 11;

FIG. 13 is a cross-sectional view with certain elements omitted taken on line 14—14 in FIG. 12;

FIG. 14 is a cross-sectional view taken on line 13—13 in FIG. 12;

FIG. 15 is an isometric view disclosing the clip of FIGS. 11-14;

FIG. 16 is an isometric view disclosing a further clip embodiment;

FIG. 17 is an isometric view disclosing a still further clip embodiment.

Figure 1:
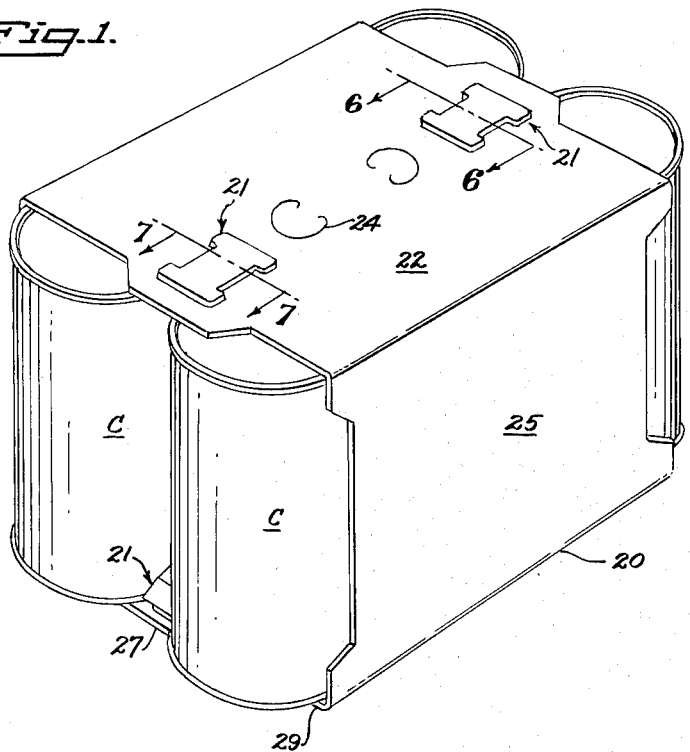
Figure 6:
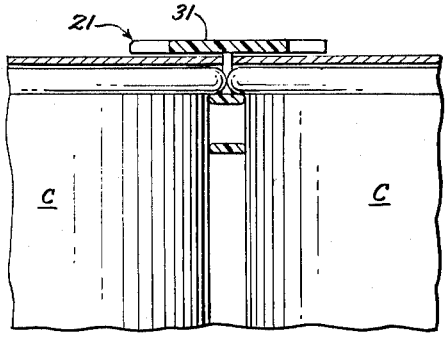
FIG. 6 is a sectional view taken on line 6—6 in FIG. 1.
Figure 7:
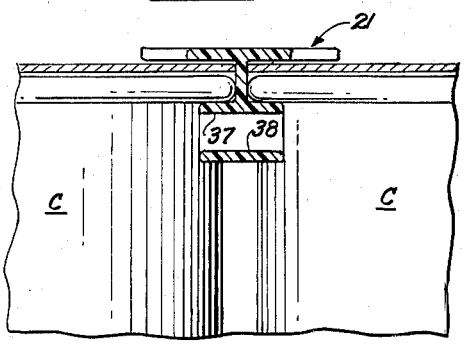
FIG. 7 is a sectional view taken on line 7—7 in FIG. 1.

The carrier of FIG. 1 comprises a paperboard blank 20, disclosed in the flattened position in FIG. 2, arranged in wrap-around relationship to a plurality of cylindrical objects or cans C. Clips or locking devices 21 are arranged in combination with the blank to positively retain the aligned cans therein. In this connection, opposed side wall portions of the blank are arranged to urge the chines of the cans against can retaining and separating portions of the clip. Four such clips are utilized with two arranged at the top portion of the carrier and two at the bottom portion thereof.

Referring to FIG. 2, the blank comprises four parallel score lines defining a top panel 22 having cuts 23 and 24 formed therein, side panels 25 and 26, bottom panel portion 27 having cuts 28 formed therein, and bottom panel portion or connecting flap 29. The side edges of the blank are cut back a predetermined amount to afford expeditious removal of the cans from the carrier and to also provide a substantial saving of paperboard material. Cuts 24 form tab members which may be punched out of the top panel to facilitate transporting the carrier.

As will be hereinafter more fully understood, such a reduction in blank size and also reduction in normal paperboard caliper is primarily made possible due to the utilization of clips 21. The clips are positioned to have portions thereof extend between opposed portions of the cans for separation and retention purposes.

The blank of FIG. 2 may be erected to the FIG. 1 position by securing the bottom panel positions 27 and 29 together with a conventional adhesive or the like. Cans C are arranged in the carrier in the manner shown with clips 21 arranged to project through slits 23 and 28 and into engagement with the cans in a manner hereinafter more fully explained. The slits for each clip are formed in the blank so as to provide two opposed tab portions 23a arranged to have mid portions thereof abut and further arranged to have their respective end portions slightly diverge from each other to facilitate insertion of the clip therein. The tab portions guide and position the clip and also effect a pinching action thereon to positively retain it in the carrier.

The more specific clip constructions and arrangements are shown in FIGS. 3–8. The clip may comprise a plastic or like material which will afford the various desiderata herein set forth. Referring more particularly to FIG. 8, the clip comprises a flat base portion 31, upstanding post portion 32, a flared portion 33 and prong portions 34. The base portion may be relieved to facilitate the side edges thereof in the manner shown to facilitate handling of the clip and also afford a reduction in clip material. The post portion is substantially T-shaped at both end portions thereof and is arranged to provide a slot 35 therethrough. As will be hereinafter more fully understood, the slot permits opposed can chines to be arranged in close proximity to each other for can retention purposes.

A plurality of upstanding ribs 36 are formed on the post end portions and are arranged to extend between the base and flared positions. As more clearly shown in FIG. 3, the side edges of the ribs are aligned to afford arcuately arranged bearing surface portions adapted to engage the therein retained can chines. The flared portion comprises co-extensive flat portions 37 and 38 substantially arranged in planes parallel to the plane of base portion 31. The flat portions are arcuately shaped at outer surface portions thereof to substantially conform to mating peripheral portions of cylindrical cans C.

As shown, a plurality of ribs may be arranged to connect the two flat portions to afford structural integrity to the clip and to also facilitate manufacture thereof. Flattened end portions 39 are arranged to taper inwardly towards each other to facilitate insertion of the clip into the blank. Prong portions 34 are each arranged in the tapered manner shown to also aid in the insertion function.

Referring now to the carrier embodiment of FIG. 9, it should be noted that cans C′ only comprise upper chines and are thus void of lower chines. Such a can may comprise an aluminum constituent or the like which constitutes a relatively thin and fragile wall construction. It is desirable to afford increased protection to this type of can from exterior forces and also with respect to damaging engagement of one of a pair of opposed cans with the other of said pair.

The blank constructions and arrangements are more particularly shown in FIG. 10. Blank 41 comprises four parallel and interrupted score lines defining a top panel 42 having slits 43 and 44 formed therein, side panels 45 and 46 having like cuts 47 and 48 formed therein, and bottom panel portions 49 and 50. Slits 44 are arranged to form tab members which may be punched out of the top panel to facilitate transporting the carrier. Panel portion 49 has a plurality of tab means 51 formed therein by suitable cut and score lines adapted to be bent into upstanding relationship between each pair of opposed cans to prevent contact therebetween.

Clips 54 are arranged to extend through the top panel of the erected paperboard blank, as shown in FIG. 9, to retain the cans in much the same manner as hereinbefore described in connection with the carrier embodiment of FIG. 1. The bottom panel portions of the carrier blank may be secured together by conventional adhesive means or the like. In contrast to the FIG. 1 embodiment, the panels of blank 41 are preferably extended to fully cover the cans.

As shown in FIGS. 11–15, clip 54 comprises a base portion 55, a post portion 56 and a flared portion 57. A slot 58 is preferably formed through the post portion for substantially the same purposes as hereinbefore discussed in connection with slot 35 of clip 21. A plurality of ribs 59 are formed on the post portions and are arranged in much the same manner as ribs 36 of clip 21, i.e. the end edges of the adjacent ribs on each side of the post portions taken together form substantially arcuately bearing surface portions for engagement with the adjacent can chine.

Flared portion 57 comprises a flat portion 60 arranged in a plane substantially parallel with the plane of the base portion and having substantially arcuately shaped side edges (FIG. 12). A wall 61 extends perpendicularly from the flat portion and a plurality of connecting ribs 62 are arranged therebetween. As more clearly shown in the side elevational view of FIG. 11, the bottom edge portion of wall 61 has an arcuate configuration to facilitate insertion of that portion of the clip between the cans.

The flared portion terminates at each end thereof in substantially triangularly shaped end wall portions 63 which are arranged to slope towards each other to further aid in the insertion function. The top surface portions of the base portion may be formed in a sloping, diverging manner to aid in avoiding interference with external objects.

FIG. 16 discloses a further clip embodiment comprising a base portion 65, a post portion 66 and a flared portion 67. A slot 68 is formed through the post portion. This modification essentially differs from the previous embodiments in that the post and flared portions of the clip are asymmetrical with respect to axis Y—Y.

It should be understood that the previous clip embodiments may also be formed in such an asymmetrical manner. Such a clip is particularly adapted for applications wherein greater assurance that the retained cans will not drop out of an end of the carrier is desired. In this connection, it should be noted that the post and flared portions arranged above and to the right of axis Y—Y are flared in a diverging manner to a greater extent than their connected portions.

FIG. 17 discloses a still further clip embodiment comprising a base portion 70, a post portion 71 and a flared portion 72. This embodiment essentially differs from the previous embodiments in that a slot is not formed through the post portion of the clip and the side edges of the post and flared portions do not comprise an arcuate configuration, but are straight.

It should be understood that the above described clips may be employed in any adaptable type of wrap-around carrier. For example, any of the clips may be employed in the can carrier disclosed in patent application Serial No. 233,771, now Patent No. 3,182,794, granted May 11, 1965, to Norman H. Moore, assigned to the assignee of this invention. Also, it should be understood that any one of the particular clip embodiments may employ features of another embodiment. For example, as above stated the first two clip embodiments may be formed in an asymmetrical manner similar to the formation of clip 64.

We claim:

1. A can carrier comprising a blank arranged in complete wrap-around relationship to at least two upstanding and opposed cylindrical objects each having a chine formed at least at one end thereof and a rigid clip extending through and attached to said blank, said clip having means thereon arranged intermediate said chines to hold them in aligned relationship and contoured to substantially correspond to the cylindrical shape of said objects.

2. A can carrier comprising a blank arranged in wrap-around relationship to at least two upstanding and opposed cylindrical objects each having a chine formed at least at one end thereof, a clip comprising co-extending base, post and flared portions, the base portion arranged to abut a panel of said blank, the post portion arranged to extend through the panel and between the chines of said cans and having bearing surface portions formed thereon substantially conforming to and positioning the chines in aligned relationship, the flared portion having arcuate surface portions arranged between side wall portions of said cans and substantially conforming thereto to effect a positive separation thereof and opposed side wall portions of said blank arranged to urge the chines of said cans toward the post portion to positively retain the cans in said carrier.

3. The invention of claim 2 further comprising a slot formed through the post portion of said clip arranged to permit the opposed chines of said cans to be maintained in substantially abutting relationship.

4. The invention of claim 2 wherein each of said cans has a second chine formed at a second end thereof and a second of said clips is arranged to extend through another panel of said blank between the cans with the bearing surface portions of said post portion engaging and positioning said second chines and the arcuate surface portions of said flared portions arranged between second side wall portions of said cans.

5. The invention of claim 2 wherein said blank has tab means formed out of another panel of said blank arranged between second ends of said cans preventing contact therebetween and wherein said cans are void of chines at the second ends thereof.

6. A paperboard blank comprising parallel score lines arranged to define a top panel, two side panels co-extending from and separated by said top panel and a bottom panel arranged to extend directly from one of said side panels, only two spaced, aligned slit arrangements formed in said top panel each arranged adjacent end edge portions thereof substantially midway between first and second score lines defining said top panel, each of said slit arrangements defining two substantially similar U shaped opposed tabs including side and base portions, the center portions of said base portions thereof being contiguous for at least ¼ the longitudinal length of said U shaped tabs to provide opposed edges effecting a pinching action when an elongated clip is inserted therethrough, the end portions of said base portions diverging away from each other to guide and position said clip to positively retain it in said carrier.

7. The invention of claim 6 wherein two of said aligned slit arrangements are also formed in said bottom panel, the two slit arrangements of said bottom panel each constructed and arranged to substantially underlie one of the slit arrangements of said top panel when said blank is erected.

8. A paperboard blank comprising first and second parallel score lines defining a top panel, first and second side panels co-extending from said first and second score lines, respectively, and respectively terminating at third and fourth score lines arranged parallel to said first and second score lines and first and second bottom panel portions directly co-extending from said third and fourth score lines, respectively, said bottom panel portions having a combined width greater than the width of said top panel, side edge portions of said side panels cut back a predetermined amount into the blank relative to side edges of said top panel, said top panel having two spaced, aligned slit arrangements formed therethrough, each of said slit arrangements arranged adjacent the end edges of the top panel and further arranged substantially mid-way between said first and second score lines, one of said bottom panel portions having two spaced, aligned slit arrangements formed therethrough adjacent end edges thereof and arranged in alignment with the slit arrangements formed through said top panel and further arranged substantially mid-way between said third score line and an end edge of said bottom panel, the width of said bottom panel substantially equalling the width of said top panel, each of said slit arrangements defining two substantially similar U shaped opposed tabs including side and base portions, the center portions of said base portions thereof being contiguous for at least ¼ the longitudinal length of said U shaped tabs to provide opposed edges effecting a pinching action when an elongated clip is inserted therethrough, the end portions of said base portions diverging away from each other to guide and position said clip to positively retain it in said carrier.

9. The invention of claim 8 wherein a clip extends through each of the slit arrangements formed in said top and bottom panels, said clips each comprising a base portion, a post portion and a flared portion, said base portion arranged in abutting relationship with the panel through which it extends, said bottom panel portions securable together whereby when the panels are maintained in erected relationship each clip of said top panel overlies a clip of said bottom panel.

10. The invention of claim 9 wherein the length of said clips substantially equals the length of said slit arrangement, the base portion of said clip having a width greater than the width of said slit arrangement, said post portion having a width less than the width of said base portion and said flared portion having arcuately shaped side portions, end portions of said side portions having a width greater than the width of said slit arrangement.

11. A can carrier comprising a one piece blank having a top, two side and a bottom panel arranged in wraparound relationship to six upstanding cylindrically-shaped cans forming two aligned rows to thus provide three pairs of opposed cans, first and second spaced clips arranged to project through the top panel of said blank, a first one of said clips arranged substantially intermediate upper chined end portions of one end pair of opposed cans and the second clip arranged substantially intermediate upper chine end portions of a second end pair of opposed cans, each of said clips comprising a base portion arranged to abut the top panel, a post portion extending downwardly from said base portion and arranged substantially intermediate the chines of said end pairs of opposed cans, and a flared portion extending downwardly from said post portion and arranged below said post portion to receive portions of said can chines thereon, said post portion providing substantially arcuately shaped outer bearing surface portions arranged to engage the chines of said cans, said flared portion having outer arcuate surface portions formed thereon substantially conforming to the cylindrical shape of said cans and the side walls of said blank arranged to urge the chines of said end pairs of cans against the post and flared portions of said clip to positively retain said cans in said carrier.

12. The can carrier of claim 11 wherein the bottom panel of said blank comprises two overlapping panel portions attached together and third and fourth of said clips are respectively arranged to project through said bottom panel substantially intermediate lower chined end portions of each of said end pair of opposed cans, the post portions of said third and fourth clips arranged intermediate the bottom chines their respective pair of opposed cans.

13. The invention of claim 11 further comprising spacer means arranged between lower end portions of pairs of opposed cans for preventing contact therebetween and wherein said cans are void of chines at the lower end portions thereof.

14. A panel and clip combination wherein the clip extends through the panel for use in retaining chined, cylindrical objects in a carrier, said clip arranged in symmetrical relationship about a longitudinal axis thereof and comprising coextensive base, upstanding post and laterally extending flared portions, said base portion abutting said panel, said post portion extending through said panel and having substantially arcuately arranged bearing surface portions formed thereon adapted to engage can chine portions, said flared portion having arcuately shaped side edge portions formed thereon adapted to engage and conform to the side wall portions of a can, the plane of the side edge portions of said flared portion arranged substantially perpendicular to the plane of said base portion and further arranged to laterally extend past said post portions.

15. The invention of claim 14 wherein said post portion has a slot formed therethrough substantially arranged on said axis adapted to receive opposed can chines in close proximity of each other.

16. A clip for use in retaining chined cylindrical objects in a carrier, said clip arranged in symmetrical relationship about a longitudinal axis thereof and comprising coextensive base, upstanding post, tapered prongs, and laterally extending flared portions, said post portion having substantially arcuately arranged bearing surface portions formed thereon adapted to engage can chine portions, said flared portion having arcuately shaped side edge portions formed thereon adapted to engage and conform to the side wall portions of a can, the plane of the side edge portions of said flared portion arranged substantially perpendicular to the plane of said base portion then further arranged to laterally extend past said post portions, said tapered prong portion arranged to coextend from flat end wall portions of said flared portion in an upward converging manner, said flat end wall portions arranged to upwardly slope toward each other in converging relationship whereby said clip may be easily inserted through a slit in a carrier blank.

17. The invention of claim 16 wherein said flared portion comprises spaced flat portions each arranged in planes which are substantially parallel to the plane of said base portion and a plurality of upstanding rib members are arranged between the flat portions, the arcuately shaped side edge portions of said flared portion being formed on the side edges of said flat portions and said rib members.

18. The invention of claim 16 wherein the flat end wall portions are each triangular in configuration.

References Cited by the Examiner

UNITED STATES PATENTS

| | | | |
|---|---|---|---|
| 2,138,984 | 12/1938 | Rounds | 206—45.19 |
| 2,680,040 | 6/1954 | Gribskov et al. | |
| 2,903,128 | 9/1959 | Brunsing | 206—65 |
| 2,967,011 | 1/1961 | Trogman | 229—52 |
| 3,016,133 | 1/1962 | Jones | 206—65 X |
| 3,022,888 | 2/1962 | Brunsing | 206—65 |
| 3,157,309 | 11/1964 | Chidsey et al. | 206—65 X |
| 3,167,213 | 1/1965 | De Paul | 206—65 X |

THERON E. CONDON, *Primary Examiner.*

MARTHA L. RICE, *Examiner.*